(12) United States Patent
Kubo (10) Patent No.: US 6,883,888 B2
(45) Date of Patent: Apr. 26, 2005

(54) IMAGE FORMING APPARATUS AND IMAGE FORMING METHOD

(75) Inventor: Takashi Kubo, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 2 days.

(21) Appl. No.: 10/435,510

(22) Filed: May 9, 2003

(65) Prior Publication Data

US 2003/0231325 A1 Dec. 18, 2003

(30) Foreign Application Priority Data

May 13, 2002 (JP) ........................................ 2002-137167

(51) Int. Cl.$^7$ .......................... G06F 15/00; H04N 1/387
(52) U.S. Cl. ............................ 347/5; 247/171; 247/224
(58) Field of Search ............................ 347/5, 171, 224, 347/111; 358/1.9, 2.1, 462; 382/173, 176, 164

(56) References Cited

U.S. PATENT DOCUMENTS 5,999,646 A * 12/1999 Tamagaki ................... 382/169

FOREIGN PATENT DOCUMENTS

| JP | 8181849 | 7/1996 | |
| JP | 8-321943 | * 12/1996 | ............. G06F/3/12 |
| JP | 2000-218874 | * 8/2000 | ............. B41J/5/30 |

* cited by examiner

*Primary Examiner*—Huan Tran
(74) *Attorney, Agent, or Firm*—David G. Conlin; George W. Hartnell, III; Edwards & Angell, LLP (57) ABSTRACT

The present invention, in the context of trial printing operation(s) for image formation, is an image forming apparatus and image forming method causing only the minimum required image forming operation(s) to be executed. In the event that image data acquired is such that text data and graphic data are mixed therein, text data and graphic data may be separately extracted from image data and are stored. Trial printing on recording paper is such that selection among (a) text image extraction format, (b) graphic-type image extraction format, (c) image-outline-only region frame format, (d) draft format, and so forth is permitted.

19 Claims, 7 Drawing Sheets

Text-type image extraction format

(a)

Graphic-type image extraction format

(b)

Region frame format (c)

Draft format (d)

FIG.6

AIUEO
ABC · · · · · · · · · · · · ·
i ii iii · · · · ·
AIUEO · · ·
ABC · · · · · ·
i ii iii · · · · ·
AIUEO · · · ·
ABC · · · · · ·
i ii iii · · ·
AIUEO · ·
ABC · · ·
i ii iii · · ·
AIU.

(a)

Black text-type image extraction format

AIUEO
ABC · · · · ·
i ii iii · · · · ·
AIUEO · · ·
ABC · · · · · ·
i ii iii · · · · ·
AIUEO · · · ·
ABC · · · · · ·
i ii iii · · ·

(b)

Color text-type image extraction format

AIUEO · ·
ABC · · ·
i ii iii · · ·
AIU.

Monochrome graphic-type image extraction format (b)

Color graphic-type image extraction format (c)

IMAGE FORMING APPARATUS AND IMAGE FORMING METHOD

BACKGROUND OF INVENTION

1. Field of Invention

The present invention relates to an image forming apparatus as represented by inkjet printers and the like and to an image forming method capable of being executed in the context of such an image forming apparatus. In particular, the present invention relates to an improved technique for use during trial printing of images on recording paper.

2. Conventional Art

Conventional image forming operations in inkjet printers are such that one sheet among a plurality of sheets of paper housed in a supply tray is first delivered to a transport path, this paper being supplied by way of the transport path to an image forming unit. In addition, at this image forming unit, ink droplets are jetted onto the surface of the paper to form a prescribed image, and this paper is thereafter discharged to an outlet tray.

With such inkjet printers, in the event that there is a desire to confirm, on actual recording paper, image layout indicating arrangement of graphic-type images and text-type images, image forming operations may be executed in "trial printing mode." For example, prior to executing image forming operations for color image data in order to form an image made up of a plurality of colors, image forming operations for all image data might be executed using only black ink. That is, image forming operations for graphic data and/or text data comprising a plurality of colors may for example be executed such that the color black is uniformly used for all color data, permitting image layout on recording paper to be confirmed on the actual recording paper.

Furthermore, one publication disclosing image forming operations in a "trial printing mode" is Patent Application Publication Kokai No. H8-181849 (1996), published in Japan. Disclosed in this publication is extraction of the outline portions of all images present in image data and execution of trial printing based on only the outline image data so obtained.

As described above, in conventional "trial printing modes," image forming operations have been executed in monochrome for all acquired image data, and/or outlined portions of all images have been extracted and the extracted outlines of all images have been drawn on recording paper. For this reason, even where it was desired to confirm layout with respect to image data that represented only a portion of the total image data, image forming operations were executed with respect to all images. In other words, even locations not requiring confirmation, for which printing was not required, were subjected to trial printing. Accordingly, with conventional "trial printing modes," there has been a limit as to the extent to which ink consumption could be reduced and the extent to which the amount of time required for trial printing operations to be carried out could be reduced.

Furthermore, prior to executing image forming operations using data for a plurality of color images, there is a desire to be able to confirm the color(s) on recording paper for only a portion of the color images. However, with conventional "trial printing modes," because image forming operations for color images are executed with respect to all image data, it has in practice not been possible to carry out image forming operations in a "trial printing mode" that would be capable of fulfilling this desire.

SUMMARY OF INVENTION

The present invention was conceived in light of the foregoing problem, it being an object thereof to provide an image forming apparatus and image forming method that, by causing only the minimum required image forming operation(s) to be executed during trial printing of image(s) produced by image formation, permit achievement of reduction in the amount of ink required for trial printing and permit achievement of reduction in the amount of time required for trial printing operations to be carried out.

In order to achieve the foregoing object, one or more embodiments of the present invention is or are such that all acquired image data is classified according to data type, and image forming operation(s) is or are executed based on only that data among such classified image data for which trial printing is requested.

More specifically, one or more embodiments of the present invention may be predicated upon an image forming apparatus which forms one or more images on a recording medium or media based on acquired image data. Such image forming apparatus may be equipped with one or more data classifying means and one or more trial printing means. At least one of the data classifying means may classify the image data according to data type. At least one of the trial printing means may receive output from at least one of the data classifying means and may, when one or more image forming modes is set to "trial printing mode," execute one or more image forming operations with respect to one or more data type subsets arbitrarily selected from among the plurality of classified data types at only one or more prescribed regions on at least one of the recording medium or media at which image formation is to be carried out using the selected data.

Such image forming operation(s) permit trial printing on recording medium or media of only image(s) containing that or those character(s), photograph(s), and/or the like for which confirmation is desired. This might be the case for example where black text data and red text data are mixed within image data and it is desired to confirm on recording medium or media only that are those region(s) at which red character(s) is or are printed, or where monochrome photograph data and color photograph data are mixed within image data and it is desired to confirm on recording medium or media only that are those region(s) at which color photograph image(s) is or are formed. That is, by not executing trial printing with respect to portion(s) for which confirmation is unnecessary, it is possible when in "trial printing mode" to achieve reduction in ink consumption and to achieve reduction in the amount of time required for trial printing operation(s). Data type of image data as used herein may refer not only to the aforementioned differentiation of text data based on character color and/or differentiation of photograph(s) or other such graphic data based on whether it or they is or are color or monochrome, it being possible to cite a variety of examples of bases for classification, including, as described below, differentiation between text data and graphic data, differentiation of text data based on character font, and so forth.

The following may be cited as an example of solution means wherein classification of image data takes place through differentiation of text data and graphic data. That is, one or more embodiments of the present invention may be predicated upon an image forming apparatus which acquires image data wherein text data and graphic data are mixed and which forms one or more images on a recording medium or media based on this image data. Such image forming apparatus may be equipped with one or more text extracting means, one or more graphic extracting means, and one or more trial printing means. At least one of the text extracting means may extract only text data from the image data. At least one of the graphic extracting means may extract only graphic data from the image data. At least one of the trial printing means may, when one or more image forming modes is set to "trial printing mode," receive only one variety of the foregoing two varieties of data, this being a variety of data for which trial printing is requested, and execute one or more image forming operations based on only that variety of data.

That is, in accordance with the present solution means, in the event that there is a desire to confirm region(s) at which character(s) is or are printed, character color(s), character font(s), and/or the like, trial printing operation(s) may be executed for only text data extracted by text extracting means. On the other hand, in the event that there is a desire to confirm region(s) at which photograph(s) or other such graphic-type image(s) is/are to be formed, image color, image size, and/or the like, trial printing operation(s) may be executed for only graphic data extracted by graphic extracting means. In such a case as well, by not executing trial printing with respect to portion(s) for which confirmation is unnecessary, it is possible when in "trial printing mode" to achieve reduction in ink consumption and to achieve reduction in the amount of time required for trial printing operation(s).

Furthermore, the following may be cited as another example of solution means wherein classification of image data takes place through differentiation of text data and graphic data. That is, such solution means may be predicated upon an image forming apparatus as above, and may be equipped with one or more text extracting means, one or more graphic extracting means, one or more region identifying means, and one or more trial printing means. At least one of the text extracting means may extract only text data from the image data. At least one of the graphic extracting means may extract only graphic data from the image data. At least one of the region identifying means may respectively receive text data from text extracting means and graphic data from graphic extracting means, and separately identify one or more respective regions on at least one of the recording medium or media at which image formation is to be carried out using these respective varieties of data. At least one of the trial printing means may, when one or more image forming modes is set to "trial printing mode," receive output from at least one of the region identifying means and draw in line drawing fashion on at least one of the recording medium or media at least one requested region perimeter, being one or more region perimeters on at least one of the recording medium or media at which image formation is to be carried out using text data and/or one or more region perimeters on at least one of the recording medium or media at which image formation is to be carried out using graphic data.

That is, in accordance with the present solution means, in the event that there is a desire to confirm only region(s) on recording medium or media at which character(s) is or are printed, trial printing operation(s) may be executed for only text data extracted by text extracting means. On the other hand, in the event that there is a desire to confirm only region(s) at which photograph(s) or other such graphic-type image(s) is or are formed, trial printing operation(s) may be executed for only graphic data extracted by graphic extracting means. In such a case as well, by not executing trial printing with respect to portion(s) for which confirmation is unnecessary, it is possible when in "trial printing mode" to achieve reduction in ink consumption and to achieve reduction in the amount of time required for trial printing operation(s). In particular, in accordance with the present solution means, because only region perimeter(s) is or are drawn in line drawing fashion for whichever of text and/or graphic data as is or are required, it is possible to achieve dramatic reduction in ink consumption and to achieve dramatic reduction in the amount of time required for trial printing operation(s).

Furthermore, where region perimeter(s) on recording medium or media is or are thus drawn in line drawing fashion, one or more line drawing indication formats for at least one of the region perimeter or perimeters on at least one of the recording medium or media at which image formation is to be carried out using text data and one or more line drawing indication formats for at least one of the region perimeter or perimeters on at least one of the recording medium or media at which image formation is to be carried out using graphic data may be caused to be mutually different. As one example which may be cited, perimeter(s) for the one may be drawn with a solid line, and perimeter(s) for the other may be drawn with a broken line. Furthermore, respective perimeters may be made to be of mutually different color.

In accordance herewith, where indication of image formation region(s) for text data and indication of image formation region(s) for graphic data are both carried out on the same recording medium or media, it is possible to easily distinguish between image formation region(s) for text data and image formation region(s) for graphic data, facilitating the region confirmation process that takes place following trial printing.

Moreover, at least one of the image forming operation or operations taking place when at least one of the image forming mode or modes is set to "trial printing mode" may be capable of being switched, in correspondence to one or more requests, between one or more operations for forming one or more draft images and one or more operations for forming one or more nondraft images. For example, taking the case of text data, this would make it possible to switch between nondraft image(s) wherein character(s) is or are printed without alteration on recording medium or media and draft image(s) wherein only frame(s) (e.g., empty rectangular box(es) after the fashion of a line drawing) corresponding to character size(s) is or are printed on recording medium or media. Likewise, taking the case of graphic data, this would make it possible to switch between nondraft image(s) wherein graphic-type image(s) is or are formed without alteration on recording medium or media and draft image(s) wherein only outline(s) of graphic-type image(s) is or are formed on recording medium or media and/or graphic-type image(s) is or are formed in monochrome. The present solution means thus permits execution of trial printing operation(s) in correspondence to user request(s).

In addition, when at least one of the image forming mode or modes is set to "trial printing mode," trial printing operation(s) in correspondence to user request(s) may also be carried out where at least one of the image forming operation or operations is carried out using one or more selected arbitrary colors. In particular, when applied to a color inkjet printer, this would permit a user to ascertain ink level(s) at respective ink cartridge(s) and to execute trial printing operation(s) using ink(s) for which large amount(s) of ink remain. This means that trial printing operation(s) can be executed so as to avoid occurrence of out-of-ink situations and/or that ink levels at respective ink cartridges can be made more uniform. Furthermore, sensor(s) may be provided which is or are capable of detecting ink levels at respective ink cartridges, the ink(s) used in "trial printing mode(s)" being determined in correspondence to ink level(s) detected by this or these sensor(s).

Furthermore, if a constitution is adopted such as permits formation of images such that different colors are used for different data types, this will permit attainment of satisfactory visibility with respect to ability to distinguish among respective data types. For example, image formation for text data might be executed using the color black and image formation for graphic data might be executed using the color red, permitting regions of image formation for respective varieties of data to be clearly distinguished. In such a case, where it is possible for a user to arbitrarily set color by data type, selection of color(s) of satisfactory visibility will facilitate the region confirmation process that takes place following trial printing.

Furthermore, also within the purview of the technical idea of the present invention are image forming methods wherein, when at least one of the image forming mode or modes is set to "trial printing mode," at least one of the trial printing means in the image forming apparatus at any one of the foregoing respective solution means is used to execute one or more image forming operations at at least one of the recording medium or media.

DESCRIPTION OF PREFERRED EMBODIMENTS

Below, embodiments of the present invention are described with reference to the drawings. Through the vehicle of the present embodiment, application of the present invention to a color inkjet printer is described.

Figure 1:
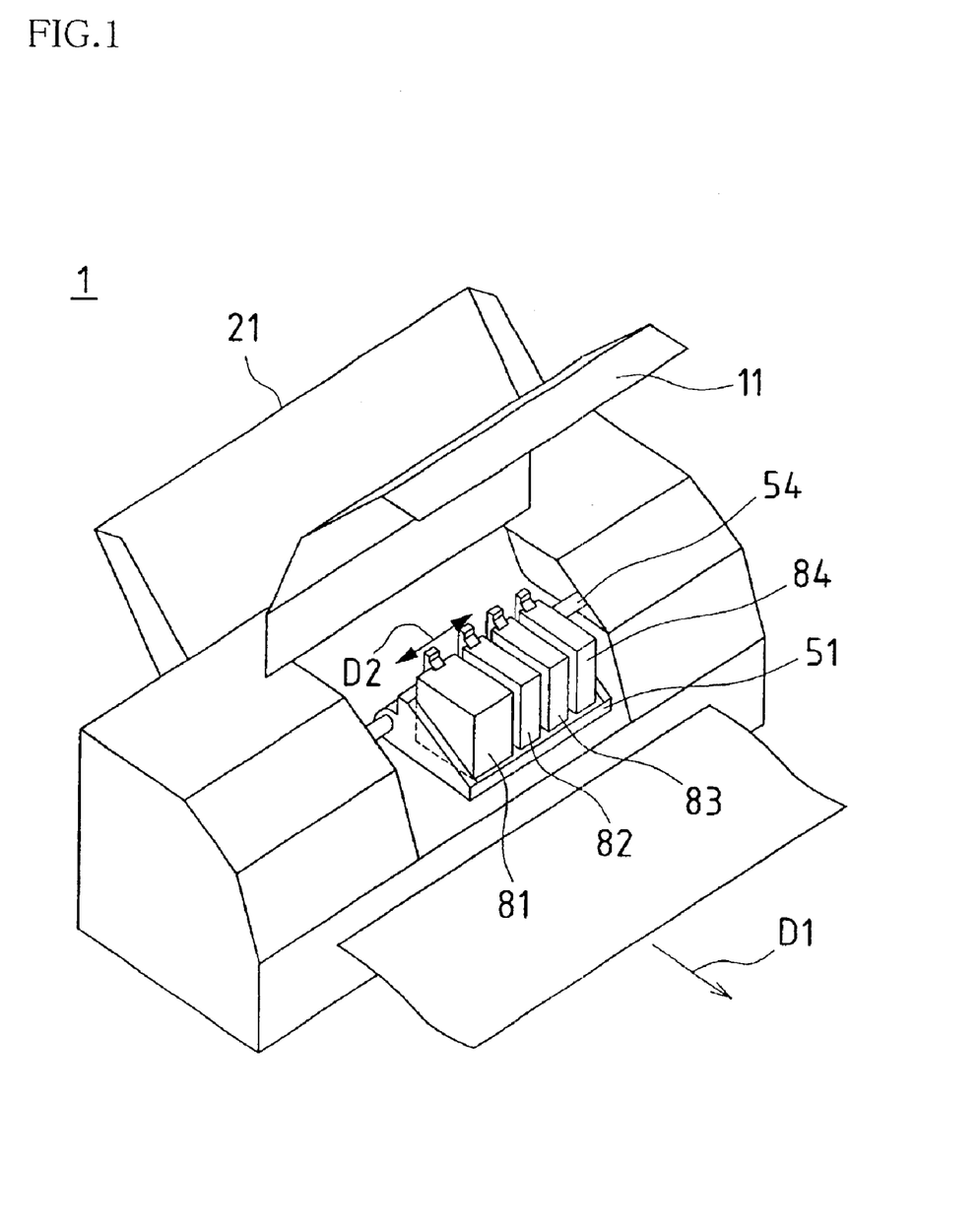
FIG. 1 is an oblique view showing the external appearance of an inkjet printer associated with one or more embodiments.
Figure 2:
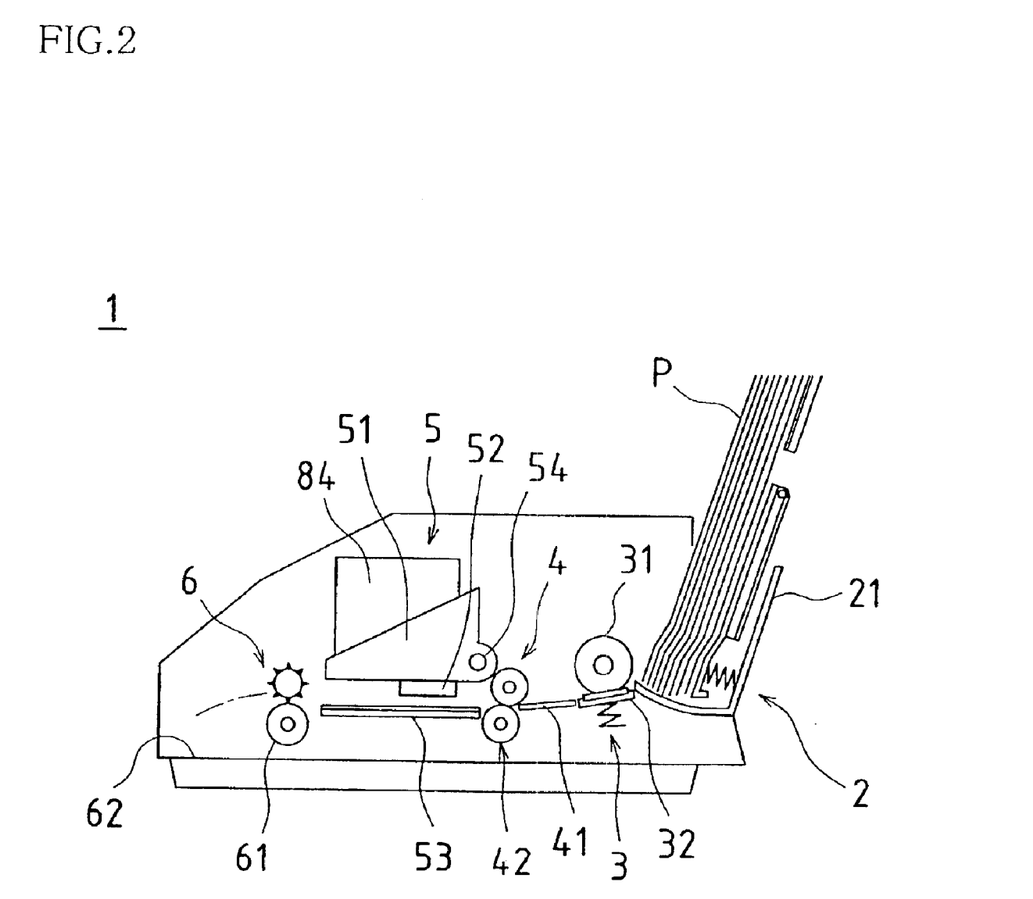
FIG. 2 is a side view showing the internal constitution of an inkjet printer.

FIG. 1 is an oblique view showing the external appearance (shown with cover 11 open) of a color inkjet printer 1 associated with the present embodiment. Furthermore, FIG. 2 is a side view showing the internal constitution of color inkjet printer 1.

As shown in these drawings, color inkjet printer 1 associated with the present embodiment is provided with media supply unit 2, separating unit 3, transport unit 4, image forming unit 5, and discharge unit 6.

Media supply unit 2 is provided with media supply tray 21 extending in a more or less vertical direction and a pickup roller, not shown, and at a time when image forming operations are initiated, recording paper P serving as recording media within media supply tray 21 is removed therefrom by the pickup roller so as to the transported toward separating unit 3. Furthermore, at times when image forming operations are not being carried out, the aforementioned media supply tray 21 functions as storage unit for recording paper P.

Separating unit 3, for supplying recording paper P supplied thereto from media supply unit 2 to image forming unit 5 one sheet at a time, is provided with supply roller 31 and separator 32. At separator 32, the force of friction between a pad region (region of contact with recording paper P) and recording paper P is set so as to be greater than the force of friction between sheets of recording paper P, P. Furthermore, at supply roller 31, the force of friction between this supply roller 31 and recording paper P is set so as to be greater than the force of friction between the pad region of separator 32 and recording paper P and greater than the force of friction between respective sheets of recording paper P, P. For this reason, even if multiple sheets of recording paper P, P, . . . are picked up by the pickup roller and are fed to separating unit 3, supply roller 31 will be able to separate these multiple sheets of recording paper P, P, . . . and feed only the topmost sheet of recording paper P to transport unit 4.

Transport unit 4, for transporting to image forming unit 5 recording paper P supplied thereto one sheet at a time from separating unit 3, is provided with guide plate 41 and pair of transport rollers 42. Transport roller pair 42 is a member for adjusting transport of recording paper P so as to cause ink droplets from printhead 52 to be jetted onto recording paper P at an appropriate location thereof when recording paper P is fed between printhead 52 and platen 53.

Image forming unit 5, for carrying out formation of images on recording paper P supplied thereto from transport roller pair 42 of transport unit 4, is provided with plurality of ink cartridges 81 through 84, printhead 52, carriage 51 carrying these ink cartridges 81 through 84 and this printhead 52, guide shaft 54 for guiding this carriage 51 in a scan direction, and the aforementioned platen 53 serving as support stage for recording paper P during image formation. Furthermore, the aforementioned ink cartridges 81 through 84 are such that separate cartridges for each of Bk (black), Y (yellow), M (magenta), and C (cyan) inks are respectively installed at carriage 51, permitting each to be replaced independent of the others. Furthermore, in the present embodiment, of the respective ink cartridges 81 through 84, Bk ink cartridge 81 is of larger capacity than respective Y, M, and C color ink cartridges 82 through 84.

Discharge unit 6, being a component for retrieval of recording paper P on which image formation has been carried out, is provided with an ink drying unit (not shown) for drying ink present on recording paper P, discharge roller 61, and discharge tray 62.

In the context of the foregoing constitution, inkjet printer 1 carries out image formation by means of operations such as the following. First, a request for inkjet printer 1 to use image data to carry out image formation is made from a computer or other such external terminal, not shown. Inkjet printer 1, having received the image formation request, uses the pickup roller to cause recording paper P in media supply tray 21 to exit media supply unit 2. Next, recording paper P, having exited therefrom, is by means of supply roller 31 made to pass through separating unit 3 and to be delivered to transport unit 4. At transport unit 4, transport roller pair 42 causes recording paper P to be fed between printhead 52 and platen 53. In addition, at image forming unit 5, ink droplets are jetted from ink jets present on printhead 52 onto recording paper P lying on platen 53 in correspondence to image data. At this time, movement of recording paper P is paused as it is held stationary over platen 53. Carriage 51, guided by guide shaft 54, is made to scan in a motion corresponding to one line in the scan direction (the D2 direction at FIG. 1) while ink droplets are jetted therefrom. Upon completion thereof, recording paper P is made to move over platen 53 by a fixed distance in the cross-scan direction (the D1 direction at FIG. 1). At image forming unit 5, by continuing to perform the foregoing processing in correspondence to image data, image formation is carried out over the entire expanse of recording paper P. Recording paper P, image formation having thus been carried out thereon, passes through the ink drying unit and is discharged by discharge roller 61 into discharge tray 62. As a result hereof, recording paper P is provided to the user as printed output.

The foregoing operations of the various components may be controlled by a controller. Such a controller is described below.

Figure 3:
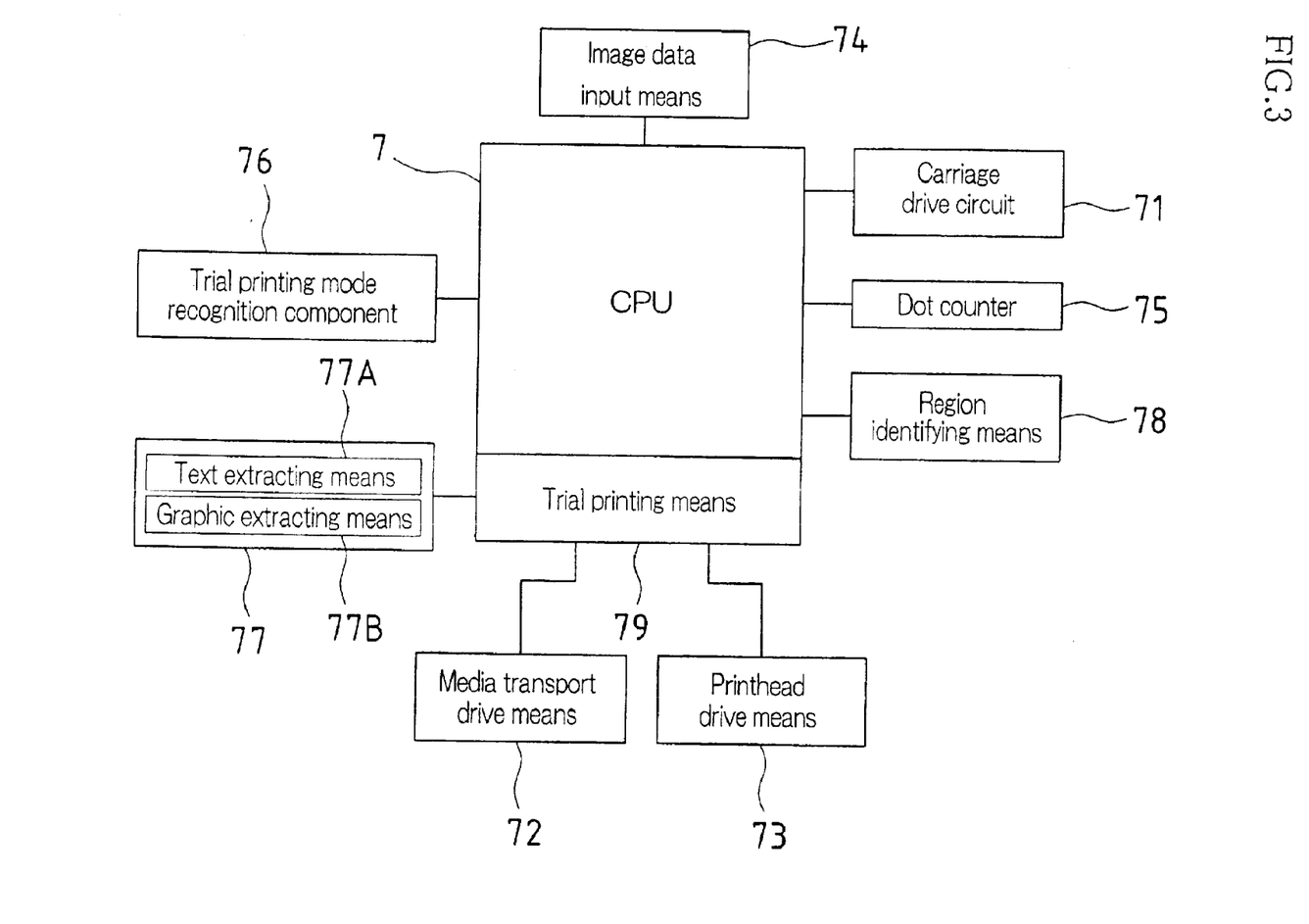
FIG. 3 is a block diagram showing the constitution of a controller for an inkjet printer.

FIG. 3 is a block diagram showing the constitution of a controller at the present inkjet printer 1. This controller is provided with dot counter 75, image data input means 74, printhead drive means 73, media transport drive means 72, and carriage drive circuit 71 controlled by CPU 7.

Carriage drive circuit 71 controls driving of a carriage motor which represents the motive force for causing the aforementioned carriage 51 to move back and forth in the scan direction.

Media transport drive means 72 respectively controls driving of the aforementioned supply roller 31, transport roller pair 42, and discharge roller 61 for transporting recording paper P in the cross-scan direction.

Printhead drive means 73 receives image data and controls driving of printhead 52. That is, control of jetting of ink droplets from respective ink jets is carried out such that a plurality of piezoelectric elements provided at the black printhead subunit and at the respective color printhead subunits are driven in cooperation with the aforementioned scanning of carriage 51 and transport of recording paper P to form prescribed image(s) on recording paper P, the piezoelectric element(s) for each ink color being driven independently of the piezoelectric element(s) for the other ink colors.

Image data input means 74, provided with a communication interface (not shown) and being connected to a host computer or the like by way of a connecting cable, is capable of receiving image data sent thereto from this host computer or the like.

Furthermore, connected to CPU 7 is read only memory (hereinafter "ROM"), not shown. Stored within this ROM is an image-recording-control-type control program or the like that controls the aforementioned carriage drive circuit 71, media transport drive means 72, and printhead drive means 73 to record color image(s) on recording paper P.

Furthermore, dot counter 75 uses image data to ascertain the number of dots (ink droplets) jetted onto recording paper P in accompaniment to execution of image forming operations, counting a separate such number of dots for each respective ink cartridge 81 through 84 since the respective times that ink cartridges 81 through 84 were last replaced with new cartridges, summing and storing same. In other words, by determining such number of dots for each ink cartridge 81 through 84, it is possible to estimate the ink level thereof.

In addition, characteristic of the present embodiment is the fact that the aforementioned controller is provided with trial printing mode recognition component 76, data classifying means 77, and region identifying means 78, and moreover, CPU 7 is provided with trial printing means 79.

Trial printing mode recognition component 76 acquires signal(s) issued in accordance with image forming mode(s) set by user(s) as a result of operation(s) performed at the aforementioned host computer or the like, and determines whether image forming mode(s) is or are set to "trial printing mode(s)." That is, in the event that image forming mode(s) is or are set to "trial printing mode(s)," trial printing operations(s), described below, is or are executed; but in the event that image forming mode(s) is or are set to "normal printing mode(s)," normal image forming operation(s), described above, is or are executed.

Data classifying means 77 classifies image data according to data type. More specifically, this data classifying means 77 is provided with text extracting means 77A and graphic extracting means 77B. When image data wherein text data and graphic data are mixed is input to image data input means 74, text extracting means 77A extracts only text data from the image data and graphic extracting means 77B extracts only graphic data from the image data, the two being stored separately.

Region identifying means 78 respectively receives the aforementioned text data from text extracting means 77A and graphic data from graphic extracting means 77B, and separately identifies region(s) on recording paper P at which image formation is to be carried out using these respective varieties of data.

Trial printing means 79 receives output from the aforementioned trial printing mode recognition component 76 and data classifying means 77, and, when image forming mode(s) is or are set to "trial printing mode(s)," executes image forming operation(s) with respect to data type subset(s) arbitrarily selected from among the plurality of data types (text data and/or graphic data) classified as described above at only prescribed region(s) on recording paper P at which image formation is to be carried out using the selected data. More specifically, in the event that there is a request for trial printing of only text data, text data from text extracting means 77A is received and image forming operation(s) is or are executed with respect to only this text data. Conversely, in the event that there is a request for trial printing of only graphic data, graphic data from graphic extracting means 77B is received and image forming operation(s) is or are executed with respect to only this graphic data.

Furthermore, where "trial printing mode(s)" is or are such that only indication of region(s) is requested, this trial printing means 79 receives output from the aforementioned region identifying means 78 and draws in line drawing fashion on recording paper P the requested region perimeter(s), this or these being region perimeter(s) on recording paper P at which image formation is to be carried out using text data and/or region perimeter(s) on recording paper P at which image formation is to be carried out using graphic data. In addition, region perimeter(s) on recording paper P at which image formation is to be carried out using text data may be drawn with a broken line, and region perimeter(s) on recording paper P at which image formation is to be carried out using graphic data may be drawn with a solid line. Of course, region perimeter(s) on recording paper P at which image formation is to be carried out using these respective varieties of data may be respectively drawn using the same style line.

Next, image forming operations which may be carried out in the present embodiment during "trial printing mode(s)" are described. First, examples of some of the image forming formats which may be selected for use during "trial printing mode(s)" at an inkjet printer associated with the present embodiment are described. At the "trial printing mode(s)" of this inkjet printer, it may be possible, for example, to select one of the four image forming formats "text-type image extraction format," "graphic-type image extraction format," "region frame format," and "draft format." Such selection may be carried out as a result of operation(s) performed by user(s) at a host computer or the like as described above.

Below, the sorts of image(s) which may be formed on recording paper P when each image forming format is selected are respectively described.

Figure 4:
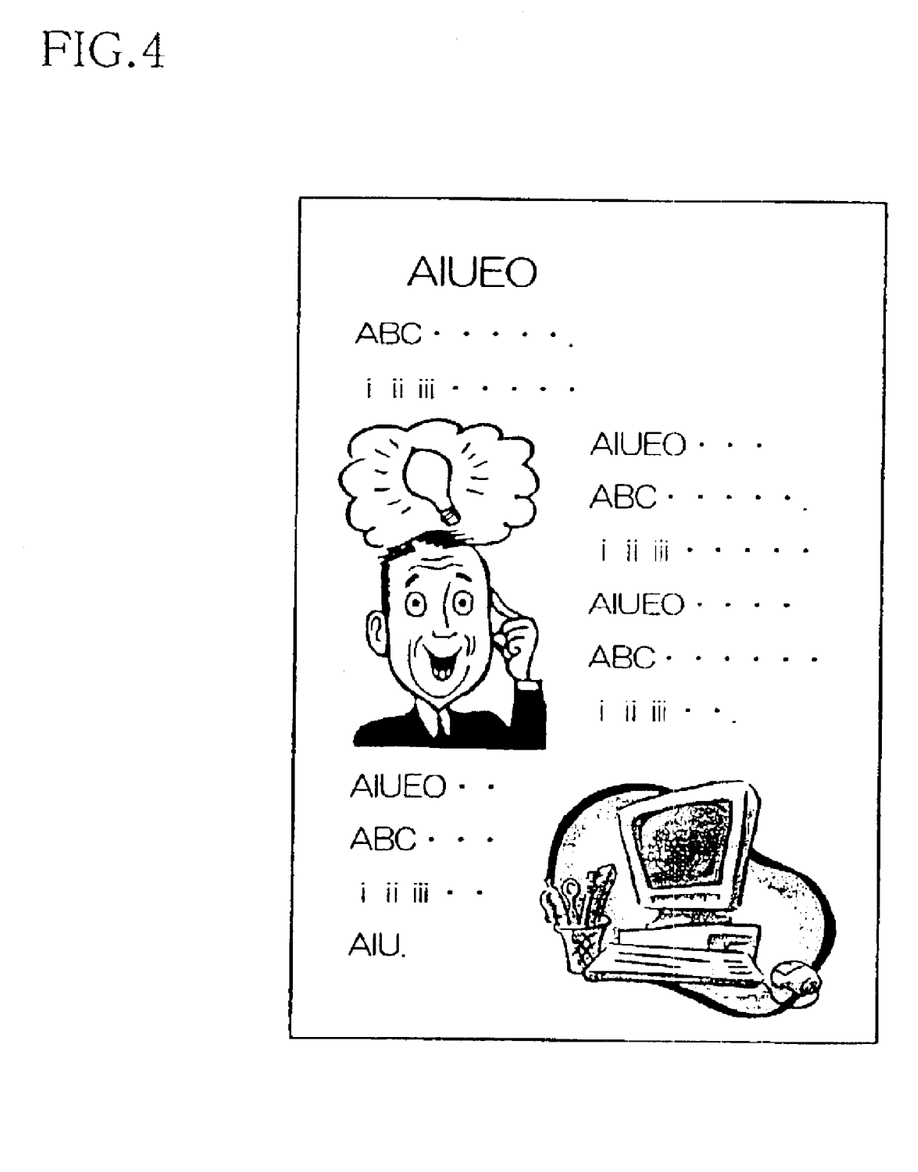
FIG. 4 is a drawing showing an example of image(s) that might be formed on recording paper using all of the image data when the image data acquired is such that text-type image data and graphic-type image data are mixed therein.
Figure 5:
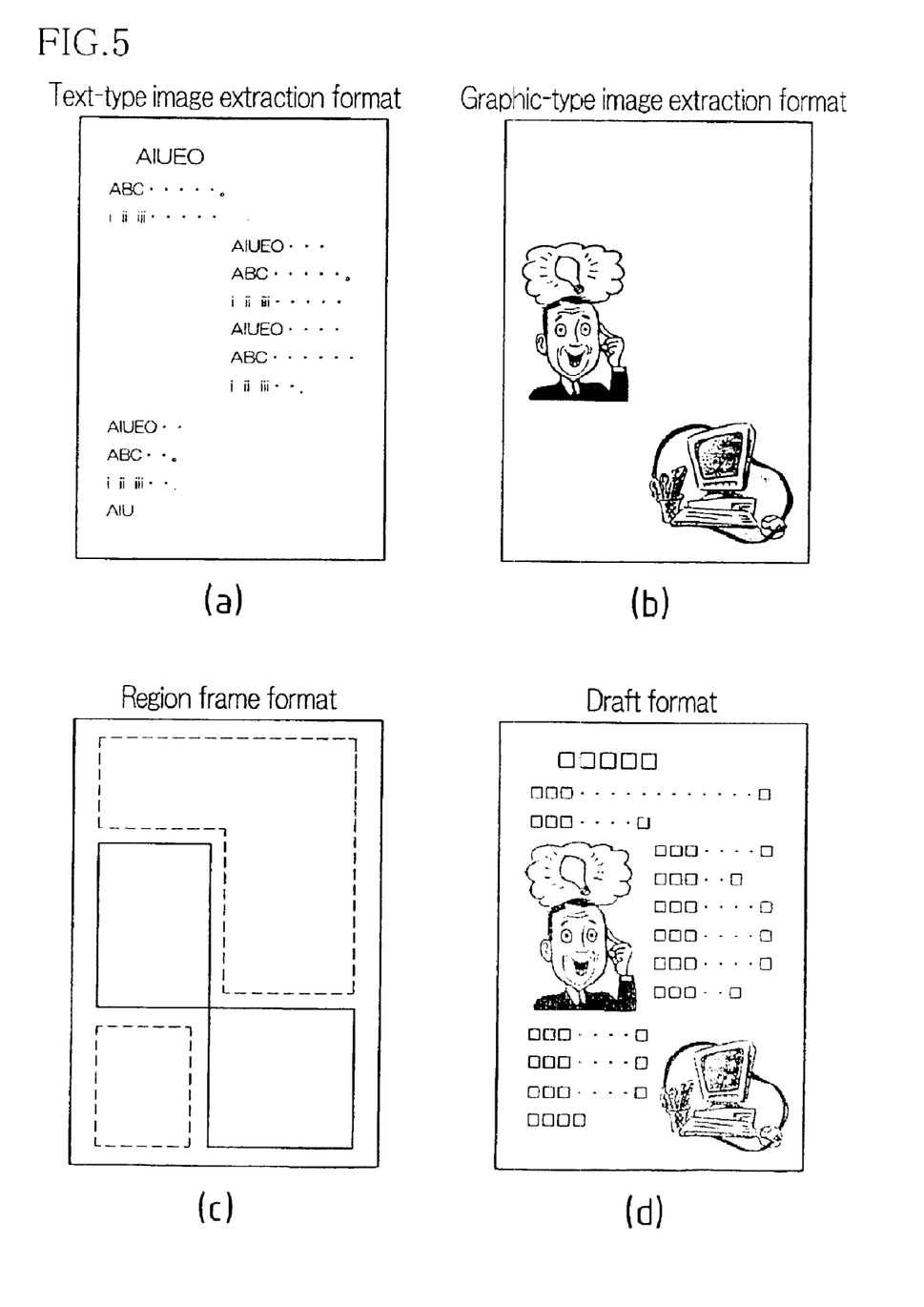
FIG. 5 is a drawing showing (a) image(s) formed on recording paper using text-type image extraction format, (b) image(s) formed on recording paper using graphic-type image extraction format, (c) image(s) formed on recording paper using region frame format, and (d) image(s) formed on recording paper using draft format.

For example, in the event that image data for forming image(s) wherein text-type image(s) and graphic-type image(s) are mixed as shown in FIG. 4 is input at image data input means 74, selecting "text-type image extraction format" under "trial printing mode(s)" could cause execution of image forming operation(s) for the text data within the image data, such operation(s) being carried out at only prescribed region(s) on recording paper P at which image formation is to be carried out using that text data, as shown at FIG. 5(a). This "text-type image extraction format" might be selected in the event that there is a desire to confirm, on recording paper P, region(s) at which character(s) is or are printed, character color(s), character font(s), and/or the like.

Furthermore, selecting "graphic-type image extraction format" under "trial printing mode(s)" could cause execution of image forming operation(s) for the graphic data within the image data, such operation(s) being carried out at only prescribed region(s) on recording paper P at which image formation is to be carried out using that graphic data, as shown at FIG. 5(b). This "graphic-type image extraction format" might be selected in the event that there is a desire to confirm region(s) at which photograph(s) or other such graphic-type image(s) is/are to be formed, image color, image size, and/or the like.

Moreover, selecting "region frame format" under "trial printing mode(s)" could cause perimeter(s) to be drawn in line drawing fashion around region(s) on recording paper P at which image formation is to be carried out using the respective text data and/or graphic data within the image data, as shown at FIG. 5(c). At such time, region perimeter(s) on recording paper P at which image formation is to be carried out using text data may be drawn with a broken line, and region perimeter(s) on recording paper P at which image formation is to be carried out using graphic data may be drawn with a solid line. This "region frame format" might be selected in the event that there is a desire to confirm region(s) on recording medium or media at which character(s) is/are to be printed, in the event that there is a desire to confirm region(s) at which photograph(s) or other such graphic-type image(s) is/are to be formed, and/or in the event that there is a desire to confirm whether text-type image region(s) and graphic-type image region(s) do not overlap.

Furthermore, selecting "draft format" under "trial printing mode(s)" could cause image formation to be carried out such that draft image(s) is/are formed for the respective text data and/or graphic data within the image data, as shown at FIG. 5(d). For text data, such draft image(s) might be drawn using rectangular frames corresponding to individual character subregion(s). For graphic data, such draft image(s) might be drawn in monochrome (e.g., using only black ink). Alternatively or in addition thereto, for graphic data, such draft image(s) might be such that only outline(s) thereof is/are formed on recording medium or media.

Image formation under "region frame format" shown at FIG. 5(c) and/or image formation under "draft format" shown at FIG. 5(d) may be further such as to permit selection among image formation carried out with respect to only text data, image formation carried out with respect to only graphic data, and image formation to be carried out with respect to both text data and graphic data.

By thus not executing trial printing with respect to portion(s) for which confirmation is unnecessary as a result of carrying out image forming operation(s) under "trial printing mode(s)" for only data as requested by user(s) and/or carrying out image forming operation(s) after or while subjecting such data to processing (e.g., extraction of region frame(s) and/or draft processing), the present embodiment makes it possible when in "trial printing mode (s)" to achieve reduction in ink consumption and to achieve reduction in the amount of time required for trial printing operation(s). In particular, where "region frame format" is selected, because only region perimeter(s) is or are drawn in line drawing fashion for whichever of text and/or graphic data as is or are required, it is possible to achieve dramatic reduction in ink consumption and to achieve dramatic reduction in the amount of time required for trial printing operation(s).

At the foregoing embodiment, it was possible to select one of the four image forming formats "text-type image extraction format," "graphic-type image extraction format," "region frame format," and "draft format" under "trial printing mode(s)" when image data wherein text data and graphic data are mixed was input at image data input means 74.

Next, "trial printing mode(s)" as it or they may be implemented under circumstances where image data made up of only text data is input at image data input means 74, or under circumstances where image data made up of only graphic data is input at image data input means 74, will be described.

Figure 6:
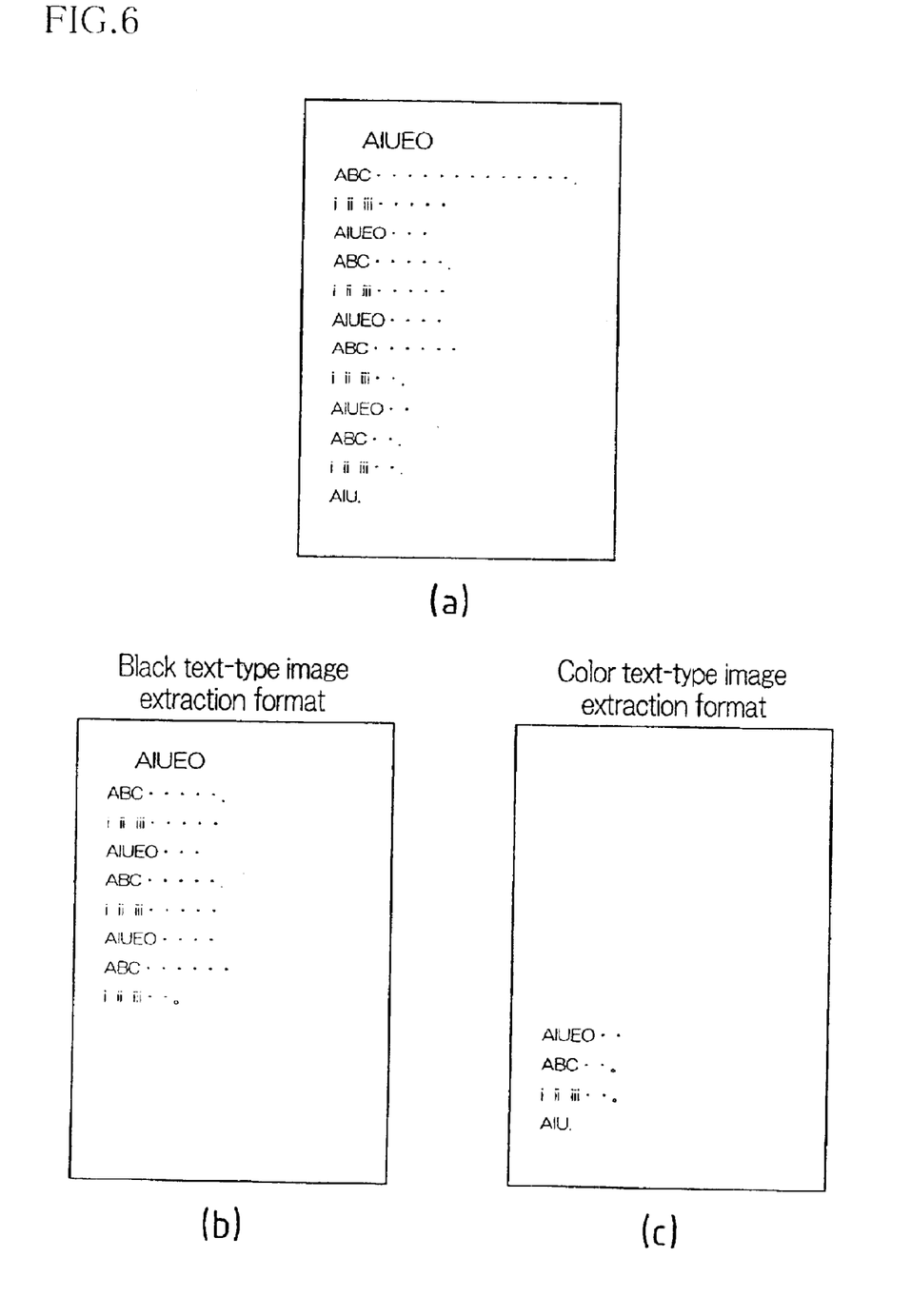
FIG. 6 is a drawing showing (a) an example of image(s) that might be formed on recording paper using all image data, (b) image(s) that might be formed on recording paper using black text-type image extraction format, and (c) image(s) that might be formed on recording paper using color text-type image extraction format, in a situation where image data comprising only text data is input at image data input means.

First, for example, where image data for forming image(s) made up of only text as shown at FIG. 6(a) is input at image data input means 74, selection of either of the image forming formats "black text-type image extraction format" and "color text-type image extraction format" might be permitted under "trial printing mode(s)."

For example, if image data is such that the characters in line 1 through line 9 at FIG. 6(a) are to be formed using black text data (black characters), and the characters in line 10 through line 13 thereat are to be formed using red text data (red characters), selecting "black text-type image extraction format" might cause image formation to be carried out with respect to only black text data as shown in FIG. 6(b). On the other hand, selecting "red text-type image extraction format" might cause image formation to be carried out with respect to only red text data as shown in FIG. 6(c). That is, where there is a desire to confirm printed region(s), character color(s), character font(s), and/or the like on recording paper P while distinguishing between or among differently colored characters, selection of the desired image forming format(s) is permitted.

Figure 7:
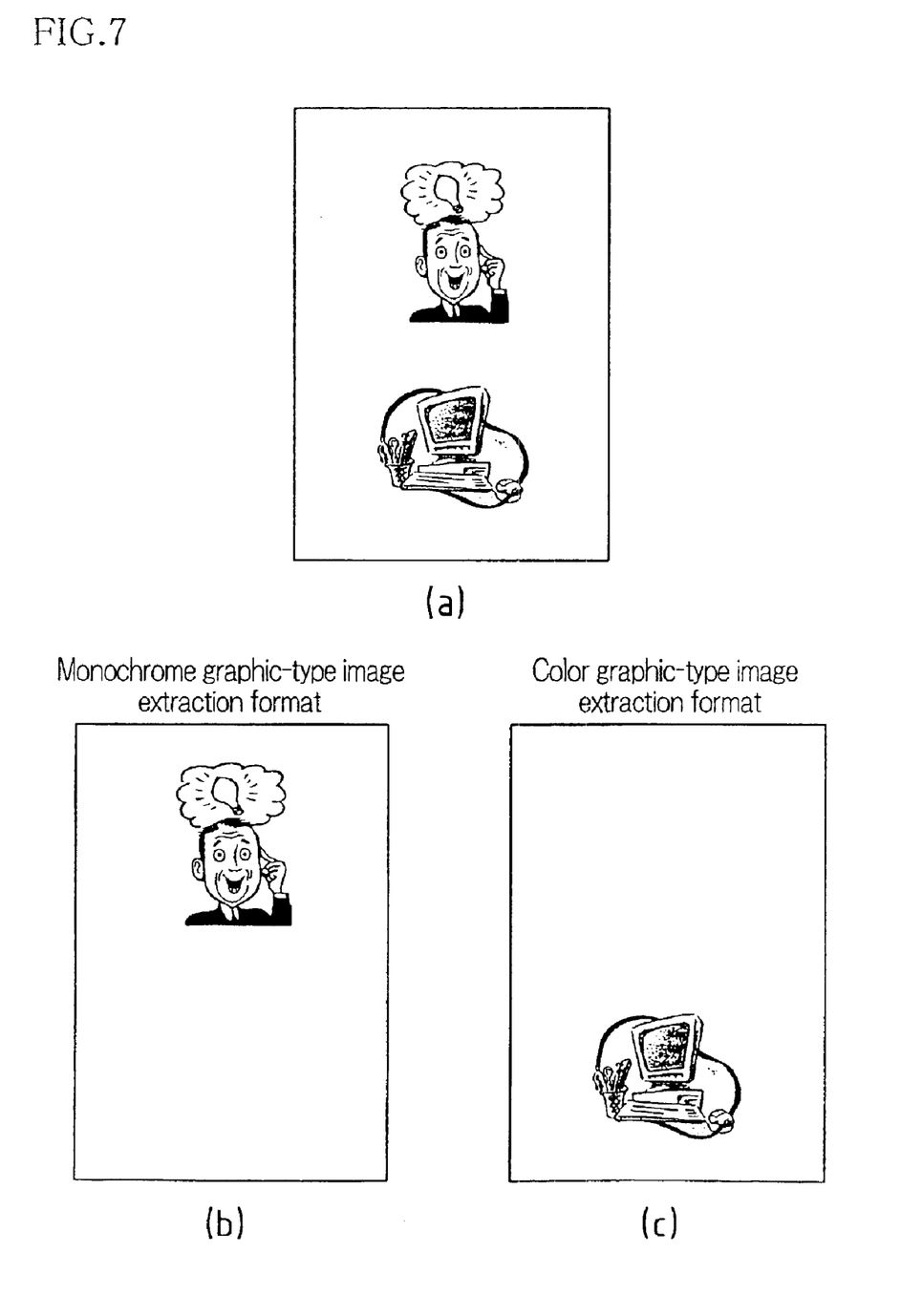
FIG. 7 is a drawing showing (a) an example of image(s) that might be formed on recording paper using all image data, (b) image(s) that might be formed on recording paper using monochrome graphic-type image extraction format, and (c) image(s) that might be formed on recording paper using color graphic-type image extraction format, in a situation where image data made up of only graphic data is input at image data input means.

Next, for example, where image data for forming image(s) made up of only two graphics as shown at FIG. 7(a) is input at image data input means 74, selection of either of the image forming formats "monochrome graphic-type image extraction format" and "color graphic-type image extraction format" might be permitted under "trial printing mode(s)."

For example, if image data is such that the upper graphic-type image at FIG. 7(a) is to be formed using monochrome graphic-type image data, and the lower graphic-type image thereat is to be formed using color graphic-type image data, selecting "monochrome graphic-type image extraction format" might cause image formation to be carried out with respect to only monochrome graphic-type image data as shown in FIG. 7(b). On the other hand, selecting "color graphic-type image extraction format" might cause image formation to be carried out with respect to only color graphic-type image data as shown in FIG. 7(c). That is, it is possible to select image forming format(s) so as to cause image forming operation(s) to be executed with respect to only that or those image(s) among a plurality of graphic-type images for which it is desired to confirm image formation region(s), image color, and/or the like on recording paper P.

At the embodiment described above, application of the present invention to a color inkjet printer 1 was described. The present invention is, however, not limited to thereto, it being possible, for example, to apply the present invention to a monochrome-type inkjet printer. Furthermore, the present invention may be applied to laser printers.

Furthermore, the present invention is not limited to serial-type inkjet printers in which image forming operations are carried out as carriage 51 is scanned in a scan direction, but may also be applied to line-type inkjet printers which do not employ such scanning action.

Furthermore, the present invention may be implemented in such fashion as to permit user(s) to ascertain ink level(s) at respective ink cartridge(s) 81 through 84 and such as to permit user(s) to select ink color(s) for use in "trial printing mode(s)" so as to cause trial printing operation(s) to be executed using ink(s) for which large amount(s) of ink remain. Doing so will permit trial printing operation(s) to be executed so as to avoid occurrence of out-of-ink situations and/or so as to permit ink levels at respective ink cartridges 81 through 84 to be made more uniform. Furthermore, the present invention may be implemented such that the ink(s) used in "trial printing mode(s)" is or are determined in correspondence to ink level(s) at respective ink cartridges 81 through 84 as detected by the aforementioned dot counter 75.

Note that the image forming apparatus of the present invention need not be provided with all of the exemplary image forming formats presented herein, there being no objection to providing any one or more thereof as necessary or desired.

The present invention may be embodied in a wide variety of forms other than those presented herein without departing from the spirit or essential characteristics thereof. The foregoing embodiments and working examples, therefore, are in all respects merely illustrative and are not to be construed in limiting fashion. The scope of the present invention being as indicated by the claims, it is not to be constrained in any way whatsoever by the body of the specification. All modifications and changes within the range of equivalents of the claims are moreover within the scope of the present invention.

Moreover, the present application claims right of benefit of prior filing date of Japanese Patent Application No. 2002-137167, the content of which is incorporated herein by reference in its entirety. Furthermore, all references cited in the present specification are specifically incorporated herein by reference in their entirety.

What is claimed is:

1. In the context of an image forming apparatus which forms one or more images on a recording medium or media based on acquired image data, an image forming apparatus characterized in that is equipped with:

one or more data classifying means that classifies the image data according to data type; and one or more trial printing means that receives output from at least one of the data classifying means and that, when one or more image forming modes is set to "trial printing mode," executes one or more image forming operations with respect to one or more data type subsets arbitrarily selected from among the plurality of classified data types at only one or more prescribed regions on at least one of the recording medium or media at which image formation is to be carried out using the selected data.

2. In the context of an image forming apparatus which acquires image data wherein text data and graphic data are mixed and which forms one or more images on a recording medium or media based on this image data, an image forming apparatus characterized in that is equipped with:

one or more text extracting means that extracts only text data from the image data;

one or more graphic extracting means that extracts only graphic data from the image data; and one or more trial printing means that, when one or more image forming modes is set to "trial printing mode," receives only one variety of the foregoing two varieties of data, this being a variety of data for which trial printing is requested, and that executes one or more image forming operations based on only that variety of data.

3. In the context of an image forming apparatus which acquires image data wherein text data and graphic data are mixed and which forms one or more images on a recording medium or media based on this image data, an image forming apparatus characterized in that is equipped with:

one or more text extracting means that extracts only text data from the image data;

one or more graphic extracting means that extracts only graphic data from the image data;

one or more region identifying means that respectively receives text data from the text extracting means and graphic data from the graphic extracting means, and that separately identifies one or more respective regions on at least one of the recording medium or media at which image formation is to be carried out using these respective varieties of data; and one or more trial printing means that, when one or more image forming modes is set to "trial printing mode," receives output from at least one of the region identifying means and that draws in line drawing fashion on at least one of the recording medium or media at least one requested region perimeter, being one or more region perimeters on at least one of the recording medium or media at which image formation is to be carried out using text data and/or one more region perimeters on at least one of the recording medium or media at which image formation is to be carried out using graphic data.

4. An image forming apparatus according to claim 3 which is an image forming apparatus characterized in that
at least one of the trial printing means is constituted so as to cause one or more line drawing indication formats for at least one of the region perimeter or perimeters on at least one of the recording medium or media at which image formation is to be carried out using text data and one or more line drawing indication formats for at least one of the region perimeter or perimeters on at least one of the recording medium or media at which image formation is to be carried out using graphic data to be mutually different.

5. An image forming apparatus according to claim 1 which is an image forming apparatus characterized in that
at least one of the trial printing means is constituted such that at least one of the image forming operation or operations taking place when at least one of the image forming mode or modes is set to "trial printing mode" is capable of being switched, in correspondence to one or more requests, between one or more operations for forming one or more draft images and one or more operations for forming one or more nondraft images.

6. An image forming apparatus according to claim 1 which is an image forming apparatus characterized in that
at least one of the trial printing means is constituted such that, when at least one of the image forming mode or modes is set to "trial printing mode," at least one of the image forming operation or operations is carried out using one or more selected arbitrary colors.

7. An image forming apparatus according to claim 5 which is an image forming apparatus characterized in that
at least one of the trial printing means is constituted such that, when at least one of the image forming mode or modes is set to "trial printing mode," at least one of the image forming operation or operations is carried out using one or more selected arbitrary colors.

8. An image forming apparatus according to claim 6 which is an image forming apparatus characterized in that
at least one of the trial printing means is constituted such that at least one of the image forming operation or operations is capable of being carried out using different colors for different data types.

9. An image forming apparatus according to claim 7 which is an image forming apparatus characterized in that
at least one of the trial printing means is constituted such that at least one of the image forming operation or operations is capable of being carried out using different colors for different data types.

10. In the context of an image forming method by which one or more images is or are formed on a recording medium or media based on acquired image data, an image forming method characterized in that
when one or more image forming modes is set to "trial printing mode," at least one of the trial printing means in the image forming apparatus at any one of claims 1 through 9 is used to execute one or more image forming operations at at least one of the recording medium or media.

11. An image forming apparatus according to claim 2 which is an image forming apparatus characterized in that
at least one of the trial printing means is constituted such that at least one of the image forming operation or operations taking place when at least one of the image forming mode or modes is set to "trial printing mode" is capable of being switched, in correspondence to one or more requests, between one or more operations for forming one or more draft images and one or more operations for forming one or more nondraft images.

12. An image forming apparatus according to claim 2 which is an image forming apparatus characterized in that
at least one of the trial printing means is constituted such that, when at least one of the image forming mode or modes is set to "trial printing mode," at least one of the image forming operation or operations is carried out using one or more selected arbitrary colors.

13. An image forming apparatus according to claim 3 which is an image forming apparatus characterized in that
at least one of the trial printing means is constituted such that, when at least one of the image forming mode or modes is set to "trial printing mode," at least one of the image forming operation or operations is carried out using one or more selected arbitrary colors.

14. An image forming apparatus according to claim 4 which is an image forming apparatus characterized in that
at least one of the trial printing means is constituted such that, when at least one of the image forming mode or modes is set to "trial printing mode," at least one of the image forming operation or operations is carried out using one or more selected arbitrary colors.

15. An image forming apparatus according to claim 11 which is an image forming apparatus characterized in that
at least one of the trial printing means is constituted such that, when at least one of the image forming mode or modes is set to "trial printing mode," at least one of the image forming operation or operations is carried out using one or more selected arbitrary colors.

16. An image forming apparatus according to claim 12 which is an image forming apparatus characterized in that
at least one of the trial printing means is constituted such that at least one of the image forming operation or operations is capable of being carried out using different colors for different data types.

17. An image forming apparatus according to claim 13 which is an image forming apparatus characterized in that
at least one of the trial printing means is constituted such that at least one of the image forming operation or operations is capable of being carried out using different colors for different data types.

18. An image forming apparatus according to claim 14 which is an image forming apparatus characterized in that
at least one of the trial printing means is constituted such that at least one of the image forming operation or operations is capable of being carried out using different colors for different data types.

19. An image forming apparatus according to claim 15 which is an image forming apparatus characterized in that
at least one of the trial printing means is constituted such that at least one of the image forming operation or operations is capable of being carried out using different colors for different data types.

* * * * *